(12) United States Patent
Kumar

(10) Patent No.: US 8,278,879 B2
(45) Date of Patent: Oct. 2, 2012

(54) SYSTEM AND METHOD FOR PROVIDING HYBRID ENERGY ON A MARINE VESSEL

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 823 days.

(21) Appl. No.: 12/259,457

(22) Filed: Oct. 28, 2008

(65) Prior Publication Data

US 2009/0284228 A1 Nov. 19, 2009

Related U.S. Application Data

(60) Provisional application No. 61/054,471, filed on May 19, 2008.

(51) Int. Cl.
*H02J 7/00* (2006.01)
(52) U.S. Cl. ...................................................... 320/128
(58) Field of Classification Search .................... 320/128
See application file for complete search history.

(56) References Cited

U.S. PATENT DOCUMENTS

| | | | |
|---|---|---|---|
| 6,784,637 B2 * | 8/2004 | Raichle et al. | 320/107 |
| 7,489,048 B2 * | 2/2009 | King et al. | 307/10.1 |
| 2004/0189251 A1 * | 9/2004 | Kutkut et al. | 320/128 |
| 2005/0235865 A1 | 10/2005 | Kumar | |
| 2008/0157593 A1 * | 7/2008 | Bax et al. | 307/10.1 |
| 2009/0103341 A1 * | 4/2009 | Lee et al. | 363/124 |
| 2011/0031931 A1 * | 2/2011 | Rembach et al. | 320/128 |

* cited by examiner

*Primary Examiner* — Ramy Ramadan
(74) *Attorney, Agent, or Firm* — GE Global Patent Operation; John A. Kramer

(57) ABSTRACT

A system for providing rechargeable energy onboard a marine vessel, the system including an energy storage device aboard a marine vessel, an interface device connected to the energy storage device configured to provide power to charge the energy storage device and/or provide power from the energy storage device to the marine vessel, a converter device connected to the interface device configured to convert power to alternating current and/or direct current, depending on an intended purpose of the system, and a conditioning device connected to the converter device, interface device, and/or energy storage device, and configured to establish an acceptable power level and/or an acceptable power waveform. The energy storage device is configured to provide power to the marine vessel to reduce fuel used, emission output, and/or mechanical noise output. A method for providing rechargeable energy onboard a marine vessel is further disclosed.

29 Claims, 4 Drawing Sheets

51 ↘

| operating a marine vessel with power provided from an energy storage device while at least one engine on the marine vessel is at least one of not operating and operating at a minimum power output to minimize at least one of fuel used, emission output, and noise output | — 52 |

|
|
v

| recharging the energy storage device when power available from the energy storage device is not at a peak level | — 54 |

|
v

| converting power to at least one of alternating current and direct current | — 56 |

|
v

| conditioning the power to at least one of establish an acceptable power level and remove extraneous noise | — 58 |

*FIG. 7*

SYSTEM AND METHOD FOR PROVIDING HYBRID ENERGY ON A MARINE VESSEL

CROSS-REFERENCE TO RELATED APPLICATIONS

This application claims the benefit of U.S. Provisional Application No. 61/054,471 filed May 19, 2008, and incorporated herein by reference in its entirety.

BACKGROUND OF THE INVENTION

This invention relates to a powered system, such as a marine vessel, and, more particularly, to a system and method for providing rechargeable energy on a marine vessel.

Mechanically, two kinds of marine vessels generally exist currently. A first version has a main engine that drives a main propeller, usually a variable pitch propeller, and that also drives a generator. FIG. 1 depicts a block diagram illustrating a prior art two-engine configuration for a marine vessel. Though a single combination of two engines 12, 13 is disclosed, multiple sets of this same configuration are used in some marine vessels. Furthermore, the engines need not be used as sets. For example, two of engine 12 may be used with one of engine 13. Similarly, multiple engines of the same type may be utilized.

A first engine 12 drives a main propeller 14, which may be a fixed pitch propeller or a variable pitch propeller, and where the engine speed may vary. The propeller may be driven through a gear box 11. A second engine 13 drives a generator 16 that produces a fixed voltage and fixed frequency of alternating current ("AC") power, such as but not limited to 600 volts, 60 Hertz. AC power from the generator 16 is provided to an AC bus distribution unit or station 18. Motors, for example thrust motors 20, may be driven with drives 22 connected to the AC bus distribution unit 18. Other loads 24, such as, but not limited to, winches, hoists, pumps, fans, auxiliary loads, lighting, etc., are also powered from the AC bus distribution unit 18. Power to the AC bus distribution unit 18 may be supplied by other sources, such as, but not limited to, other on-board generators or off-board sources, including port and/or dock stationary generators. Therefore, though one AC bus distribution unit 18 is illustrated, those skilled in the art will readily recognize that a plurality of bus distribution units 18, propellers 14, engines 12, 13, and generators 16 may be utilized.

FIG. 2 depicts a block diagram of another prior art marine system where a single engine 12 drives a propeller 14. In this configuration, engine speed runs at a speed proportional to AC bus frequency and the propeller pitch is controlled. Though only a single engine/propeller combination is illustrated, multiple combinations are typical in marine vessels. A generator 16, driven by the engine 12 and at least one gearbox 11, produces a fixed voltage and a fix frequency AC power, such as but not limited to 600 volts, 60 Hertz. AC power from the generator 16 is provided to an AC bus distribution unit or station 18. Motors, for example thruster motor 20, may be driven with drives 22 connected to the AC bus distribution unit 18. Other loads 24, such as, but not limited to, winches, hoists, pumps, fans, auxiliary loads, lighting, etc., are also powered from the AC bus distribution unit 18. Power to the bus distribution unit 18 may be supplied by other sources, or generators, such as, but not limited to, other on-board generators, off-board sources including dockside and/or port side electrical outlets, and port and/or dock stationary generators. Therefore, though one AC bus distribution unit 18 is illustrated, those skilled in the art will readily recognize that a plurality of bus distribution units 18, engines 12, propellers 14, and generators 16 may be utilized.

FIG. 3 depicts an electrical drive configuration for a marine vessel, according to the prior art. As illustrated, electrical power is provided from the engine 13, through the generator 16, and then to the AC bus distribution unit 18. Electrical power is provided from the AC bus distribution unit 18 to the main motor propeller 14 by way of its drive 15, thrust motor propeller 20 by way of its drive 22, and other loads 24, which are disclosed above. The engine in this configuration typically runs at a constant speed to generate the appropriate frequency for an AC distribution system for the marine vessel.

In each embodiment disclosed above, the engine 12 provides initial power to the marine vessel. Therefore, the engine 12 must be operating to provide power. As marine vessels are currently used, for example when the marine vessel is a tugboat, the prior art mechanical drive and electrical drive configurations disclosed above result in fuel consumption and emissions being produced even while the tugboat is waiting to perform a mission. Owners and operators of marine vessels would benefit from a system and method where emissions are reduced and fuel use is lowered, due to how hybrid energy is provided and used aboard the marine vessel. This is especially desirable when the marine vessel, such as, but not limited to a tugboat, is waiting to assist a larger ship, is stationary, or is handling a light load. Owners and operators also will benefit from having marine vessels that operate quieter when close to shorelines where engine noise is not desired.

BRIEF DESCRIPTION OF THE INVENTION

Embodiments of the present invention relate to a system and method for providing rechargeable energy onboard a marine vessel. In one aspect, the system includes an energy storage device aboard a marine vessel. An interface device is connected to the energy storage device and configured to provide power to charge the energy storage device and/or provide power from the energy storage device to the marine vessel. A converter device is connected to the interface device and configured to convert power to alternating current and/or direct current, depending on an intended purpose of the system. A conditioning device is connected to the converter device, interface device, and/or the energy storage device, and is configured to establish an acceptable power level and/or an acceptable power waveform. The energy storage device is configured to provide power to the marine vessel to reduce fuel used, emission output, and/or mechanical noise output.

In another embodiment, the system includes an alternating bus distribution unit is configured to provide power to a plurality of subsystems aboard the marine vessel. An energy storage device, aboard the marine vessel, is in communication with the alternating bus distribution unit to provide power to the alternating bus distribution unit and/or receive power from the alternating bus distribution unit. An intermediate subsystem is connected between the alternating bus distribution unit and the energy storage device and configured to convert the power and/or condition the power for receipt by the alternating bus distribution unit and/or the energy storage device.

In yet another embodiment, the method includes operating a marine vessel with power provided from an energy storage device while at least one engine on the marine vessel is not operating and/or operating at a minimum power output, to reduce fuel used, emission output, and/or mechanical noise output. The energy storage device is recharged when power available from the energy storage device is not at a peak level.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which:

FIG. 7 depicts a flowchart illustrating an exemplary embodiment of a method for utilizing hybrid energy on a marine vessel.

DETAILED DESCRIPTION OF THE INVENTION

Figure 1:
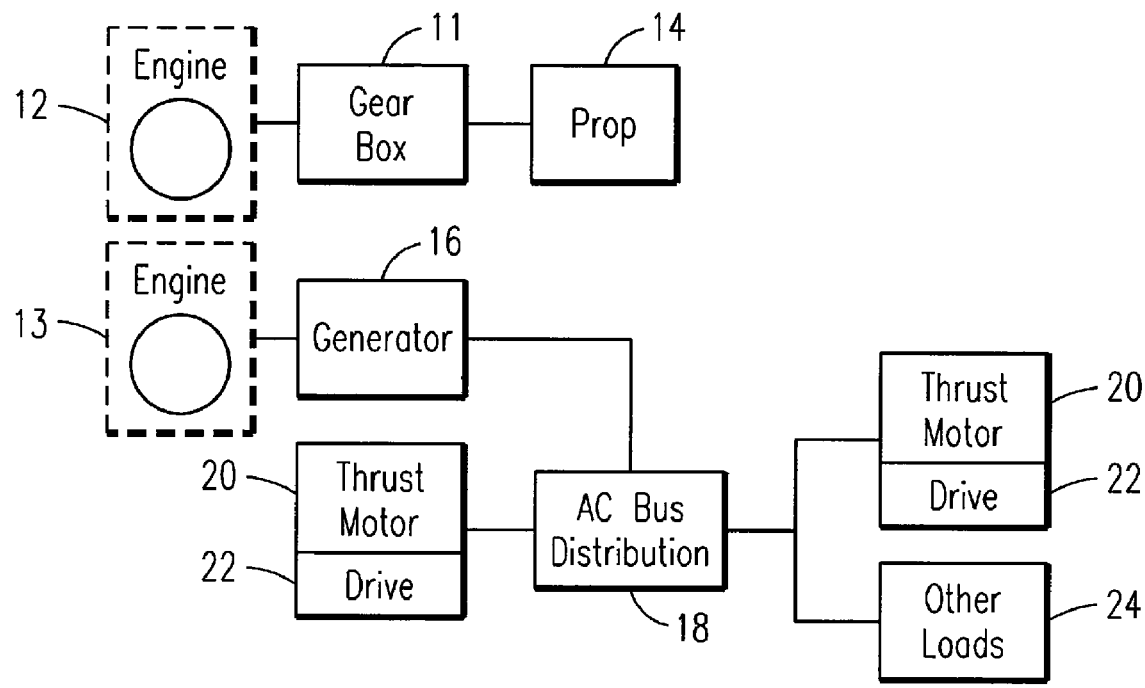
FIG. 1 depicts a block diagram illustrating a prior art mechanical dual engine configuration for a marine vessel.

Reference will now be made in detail to the embodiments consistent with the invention, examples of which are illustrated in the accompanying drawings. Wherever possible, the same reference numerals used throughout the drawings refer to the same or like parts. As disclosed below, multiple version of a same element may be disclosed. Likewise, with respect to other elements, a singular version is disclosed. Neither multiple versions disclosed nor a singular version disclosed shall be considered limiting. Specifically though multiple versions are disclosed a singular version may be utilized. Likewise, where a singular version is disclosed, multiple versions may be utilized.

Figure 4:
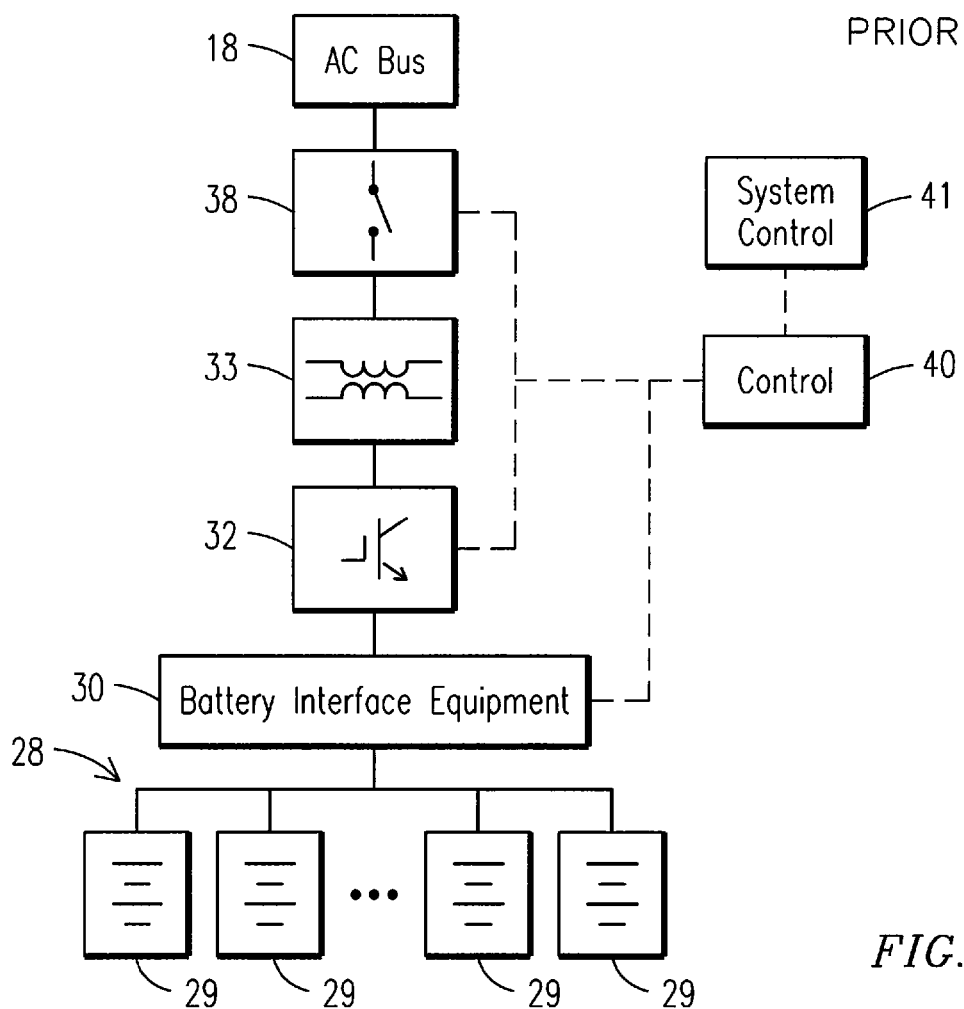
FIG. 4 depicts a block diagram illustrating an exemplary embodiment of a hybrid energy system for use with a marine vessel.

FIG. 4 depicts a block diagram illustrating an exemplary embodiment of a hybrid energy system for use with a marine vessel. The dotted lines represent control connections and the solid lines represent power connections. Batteries 29, or another energy storage device 28, are connected to an interface device 30, such as but not limited to battery interface equipment. Though a plurality of batteries 29 is illustrated, those skilled in the art will readily recognize that a single battery may be used as well. Similarly, though batteries are disclosed, those skilled in the art will further recognize that other energy storage devices, such as but not limited to capacitors, flywheel, etc., may be used. Furthermore the battery, collectively batteries, and/or other energy storage device may be referred to as an energy storage device 28. The interface device 30 is connected to a converter device 32, which in turn is connected to a conditioning device 33, such as but not limited to a filter/transformer. The conditioning device 33 is connected to a switching device 38, which in turn is connected to an AC bus distribution unit 18.

The dotted lines illustrate command/communication lines and the solid lines illustrate power lines in FIG. 4. A system control 41 commands a specific amount of power. This command may be implemented by a user operating a throttle control. In other words, the system control 41 is typically used to decide how much power should be transferred based on the operator request. The command from the system control 41 is provided to a control subsystem 40. The control subsystem 40 commands the interface device 30, converter device 32, conditioning device 33, and/or switching device 38 to provide the desired amount of power requested by the system control 41. The control subsystem 40 ensures the appropriate power is supplied by determining a status of the inverter, filter/transformer, and switch gear and commanding these elements to be in a correct configuration to provide the power required. Depending on the commands, power is provided to the AC bus distribution unit 18 and/or power is taken from the AC bus distribution unit 18.

Power provided to the AC bus distribution unit 18 passes through the converter device 32, such as but not limited to an inverter, to convert power from direct current (DC) to alternating current (AC). Depending on the quality of the power required, it is passed through a conditioning device 33. The conditioning device 33 may have a filter and/or a transformer. Those skilled in the art will readily recognize that the filter and transformer may be two independent devices. The filter function of the conditioning device 33 may be provided to remove extraneous harmonics, or noise, or in other words to establish an acceptable electrical noise level or otherwise establish an acceptable power waveform. The transformer function of the conditioning device 33 may be provided to step-up and/or step-down the power where the transformer function further insures that voltage levels are compatible for use aboard the marine vessel. The transformer function of the conditioning device 33 may also be used to isolate power should the energy storage device 28 unexpectedly become grounded or to provide isolation from different power components. Collectively, the conditioning device 33 and the converter device 32 may be referred to as an intermediate subsystem. Though these devices are illustrated as separate devices those skilled in the art recognize that the intermediate subsystem may be a single device.

Figure 2:
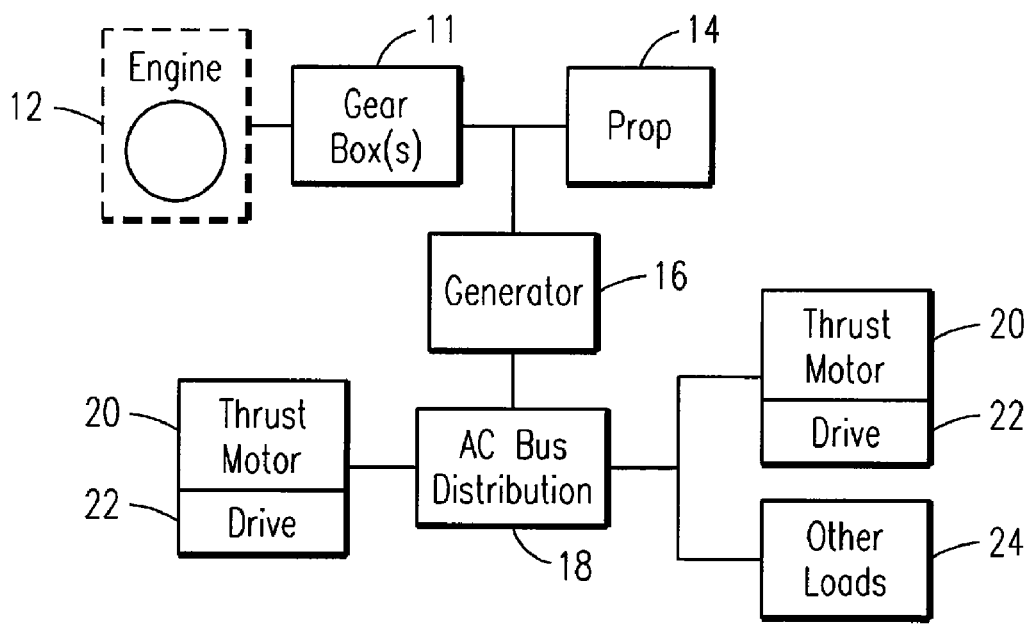
FIG. 2 depicts a block diagram illustrating another prior art mechanical single engine configuration for a marine vessel.

If power is already at an established level and the harmonics are in agreement, using the conditioning device 33 may not be needed. In such a case the power is provided from the converter device 32 to a switching device 38 (or other switch gear), and then to the AC bus distribution unit 18. The switching device 38 is provided to disengage the hybrid energy system from the AC bus distribution unit 18 if power is not required from the system for any number of reasons, such as, but not limited to, during shut down of the engine for maintenance, and/or disabling of the system for any reason such as but not limited to configuring a subsystem. Therefore, all elements below the conditioning device 33 are also disconnected when the switch 38 in an open position. The power then is provided to the AC bus distribution unit as is disclosed above with respect to FIGS. 1-3, e.g., power is supplied from an engine/generator unit.

As disclosed above, the control subsystem 40 is also used to command providing power from the energy storage device 28 to the AC bus distribution unit 18, and/or to command charging of the batteries 28, where power for charging is supplied from the AC bus distribution unit 18. The control subsystem 40 is able to control how much power should be transferred between the AC bus distribution unit 18 and the energy storage device 28, where how much power is returned to the energy storage device 28 is further determined based on the capacity and/or type of batteries being used. The interface device 30 may be configured to allow charging of the energy storage device 28.

Figure 5:
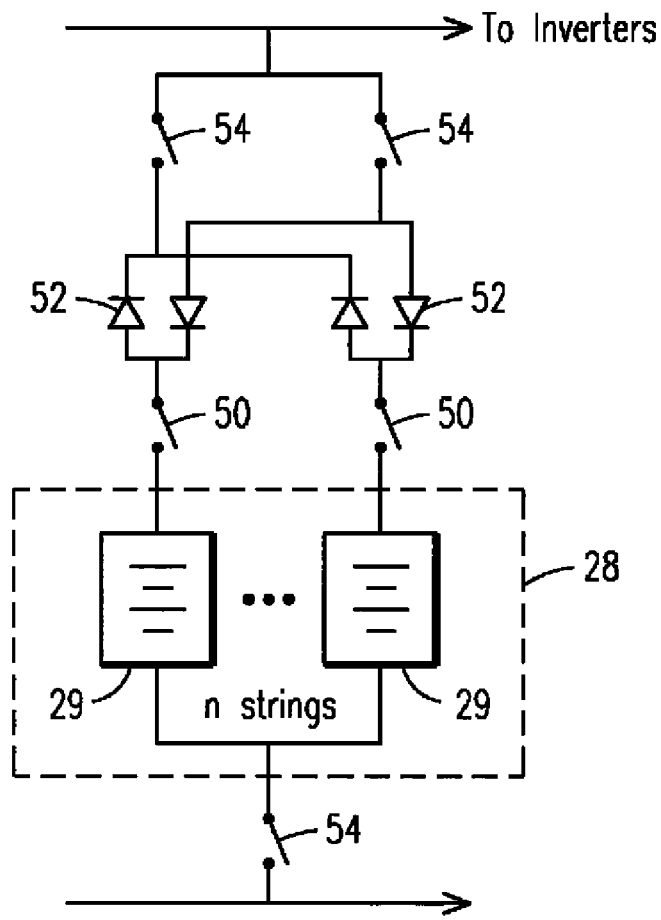
FIG. 5 depicts a block diagram illustrating an exemplary embodiment of an interface device.

FIG. 5 depicts a block diagram illustrating an exemplary embodiment of the interface device. Individual battery contactors 50 are provided. Diodes 52 are also provided to prevent circulating currents. A second set of contactors 54 is also provided to enable discharge of the batteries as well as to enable charging of the batteries. Though not shown, reactors may be included in the interface device as well as current, voltage, and/or temperature sensors. Though those skilled in the art will recognize that a plurality of embodiments for the interface device 30 are possible, an example of an interface device 30 is disclosed in U.S. Application Publication No. 2005/0235865 A1, dated Oct. 27, 2005, incorporated by reference herein in its entirety.

In an exemplary embodiment the energy storage device 28 is multiple batteries 29 connected in parallel. These individual batteries 29 are typically utilized to store energy for use as directed by the control subsystem 40. An exemplary example of the type of batteries 29 used is a high temperature battery, such as but not limited to sodium nickel chloride. Using such batteries 29 in the energy storage device 28 may require that the batteries 29 be heated to achieve a desired operating temperature. During normal operation, a voltage may be applied across the heater terminals of each battery 29, thereby activating an electrical heating circuit to heat the battery. The control subsystem 40 may also function to monitor the temperature of the batteries 29, or energy storage device 28, and heat and/or cool the batteries 29 as required.

When the marine vessel is not operating at a peak power level (e.g., when the marine vessel is not using all the power supplied by engine-run generators), the AC bus distribution unit 18 can provide power back to the batteries 29 or other energy storage device 28. In another exemplary embodiment, the total capability of the electrical system of the marine vessel may be increased by using both peak power and additional available power to the AC bus distribution unit 18, by way of the energy storage device 28. In operation, instead of expending fuel when enough electrical power is available, electrical power may be used to operate the marine vessel. Similarly, if an engine is being replaced, a smaller less powerful engine may be utilized since additional power no longer available with the larger engine may be instead provided by the AC bus distribution unit 18, with power originating at the energy storage device 28. Therefore, even when there is an engine failure, power to operate the marine vessel is available from the AC bus distribution unit 18 by way of the energy storage device 28.

Figure 6:
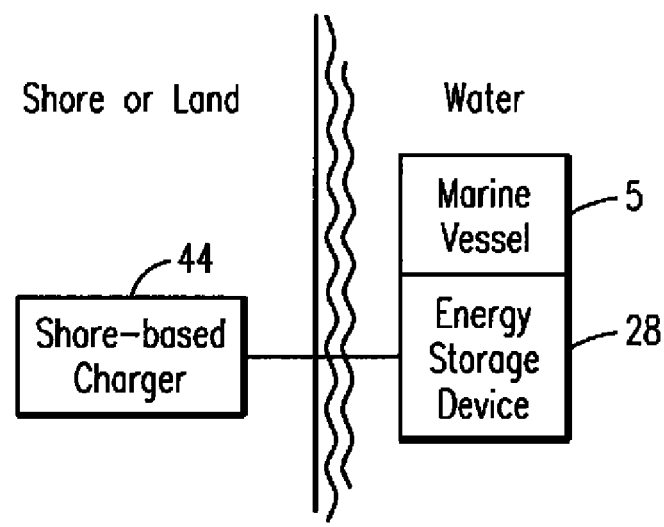
FIG. 6 depicts a block diagram illustrating a remote charger system connected to a marine vessel.

FIG. 6 depicts a block diagram of a marine vessel 5 having an energy storage device 28 charged remotely. With respect to marine vessels that perform missions close to a dock or shore, such as but not limited to a tugboats, instead of charging the energy storage device 28 with an on-board system as disclosed above, the batteries 29 in the energy storage device may be recharged with a charging system 44 located on the dock or on-shore during periods while the tugboat or other marine vessel 5 is awaiting its next assignment. When the marine vessel 5 is again ready to perform its mission, since it has a fully charged energy storage device 28, it is capable of motoring without burning fuel, which in turn reduces emissions produced. Additionally when near a port or dock, the marine vessel 5 may operate with less emission and/or mechanical noise to an extent where if enough power is stored, the engine can be shut off and the operation of the marine vessel 5 can be completely silent.

FIG. 7 depicts a flowchart illustrating an exemplary embodiment of a method for providing rechargeable energy onboard a marine vessel. The flowchart 51 discloses operating a marine vessel with power provided from an energy storage device while at least one engine on the marine vessel is not operating and/or operating at a minimum power output to minimize (or at least reduce) fuel used, emission output, and/or mechanical noise output, at 52. The energy storage device is recharged when power available from the energy storage device is not at a peak level, at 54. (Power for recharging the energy storage device may be supplied from, for example, the AC bus 18, which in this mode may receive power from an engine-run generator, as described above.) The power is converted to alternating current power and/or direct current power, at 56. Converting power to alternating current further involves converting direct current power provided from the energy storage device to alternating current. Converting power to direct current further involves converting alternating current provided from the marine vessel and/or a remote charger to direct current to recharge the energy storage device. The power is conditioned to establish an acceptable power level, acceptable power waveform and/or remove extraneous electrical noise, or establish an acceptable noise level, at 58.

Figure 3:
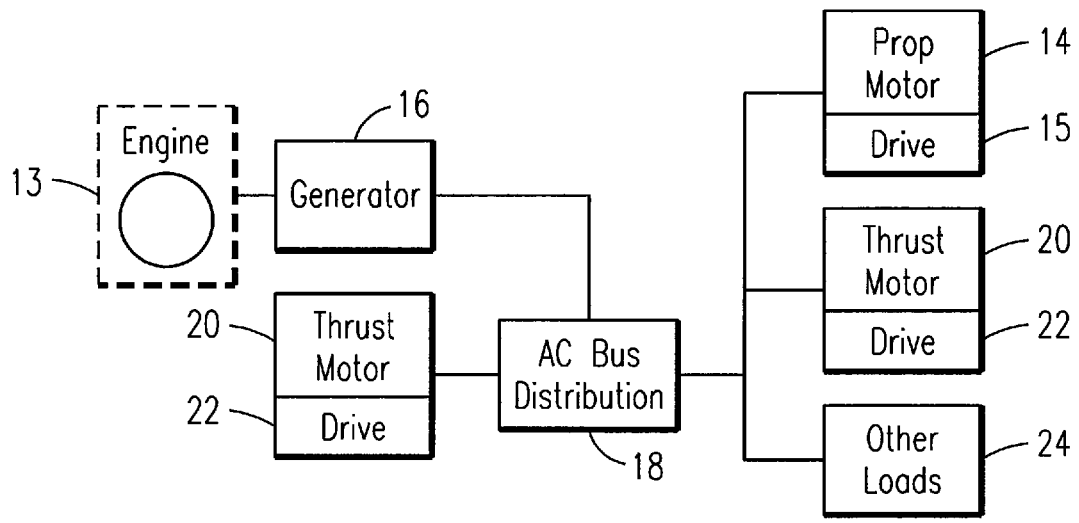
FIG. 3 is a diagram illustrating a prior art electrical drive configuration for a marine vessel.

Exemplary embodiments of the invention may be used to retrofit an existing marine vessel, such as but not limited to as a retrofit assembly. Many of the subsystems, or elements, disclosed with respect to FIGS. 3-4 are already available on many marine vessels. The most prominent subsystem, or element, to include is the energy storage device 28, such as but not limited to a bank of batteries 29, and the battery interface equipment disclosed in FIG. 5. Space onboard the marine vessel must be identified/allocated for locating the energy storage device. Likewise, the methods disclosed with respect to FIG. 7 may also be applied to a marine vessel retrofitted with at least the energy storage device 28. Therefore, the elements included in the retrofit assembly may include all of the elements disclosed with respect to either FIG. 3 and/or FIG. 4 or only select elements, since the other elements may already be provided on the marine vessel.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A system comprising:
   an energy storage device configured to be disposed aboard a marine vessel having an alternating current bus that supplies first alternating current to power one or more alternating current loads of the marine vessel, the energy storage device configured to supply first direct current;
   a converter device configured to be conductively coupled with the energy storage device and the alternating current bus and to convert the first direct current supplied from the energy storage device to the first alternating current; and
   a switching device configured to be conductively coupled with the alternating current bus and the converter device, the switching device configured to be disposed between the alternating current bus and the converter device such that the switching device closes to conductively couple the energy storage device and the converter device with the alternating current bus, the switching device also configured to open to disconnect the energy storage device and the converter device from the alternating current bus while an alternating current generator connected to the alternating current bus remains conductively coupled with the one or more alternating current loads;

wherein the energy storage device is configured to provide the first direct current to the converter device that changes the first direct current to the first alternating current for transmission along the alternating current bus for powering the one or more alternating current loads, the energy storage device providing the first direct current to reduce at least one of fuel consumed, emissions generated, or mechanical noise generated by the marine vessel.

2. The system according to claim 1, wherein the converter device is configured to convert a second alternating current provided by the alternating current generator on the alternating current bus to a second direct current for charging the energy storage device.

3. The system according to claim 1, further comprising a control subsystem configured to control distribution of the first alternating current that is converted from the first direct current supplied by the energy storage device on the marine vessel.

4. The system according to claim 1, further comprising an interface device that is configured to couple the energy storage device to the alternating current bus and to provide for charging of the energy storage device from second alternating current on the alternating current bus.

5. The system according to claim 1, wherein the switching device is configured to control when the converter device is conductively coupled with the energy storage device.

6. The system according to claim 1, wherein the converter device is configured to convert second alternating current received onto the alternating current bus from a charging system located remote of the marine vessel to second direct current to recharge the energy storage device.

7. The system according to claim 1, wherein the energy storage device comprises one or more of a capacitor, at least one battery, or a flywheel.

8. The system according to claim 7, wherein the at least one battery includes a high temperature battery.

9. The system according to claim 1, wherein an upper power capability of the marine vessel is increased by utilizing an existing power capacity with power provided by the energy storage device.

10. The system according to claim 1, wherein at least one of the energy storage device or the converter are provided as a retrofit assembly for installation on the marine vessel.

11. A system comprising:
an alternating current bus distribution unit configured to provide alternating current along an alternating current bus to a plurality of subsystems aboard a marine vessel that are connected with an alternating current generator by the alternating current bus;
an energy storage device aboard the marine vessel and in communication with the alternating current bus distribution unit, the energy storage device configured to provide power to the alternating current bus distribution unit to power the plurality of subsystems and receive power from the alternating current bus distribution unit to charge the energy storage device; and
an intermediate subsystem connected between the alternating bus distribution unit and the energy storage device, wherein the intermediate subsystem is configured to at least one of convert direct current supplied by the energy storage device to alternating current as the power provided to the alternating current bus distribution unit or convert alternating current supplied by at least one of the alternating current generator or an off-board alternating current source to direct current as the power received by the energy storage device,
wherein the intermediate subsystem includes a switching device that closes to conductively couple the energy storage device and the intermediate subsystem with the alternating current bus distribution unit and that opens to disconnect the energy storage device and the intermediate subsystem from the alternating current bus distribution unit while the alternating current bus distribution unit and the alternating current generator remain conductively coupled with the plurality of subsystems.

12. The system according to claim 11, wherein the intermediate subsystem comprises at least one of a converter device or a conditioning device.

13. The system according to claim 11, wherein the alternating current bus distribution unit is configured to receive at least some of the alternating current from a charging system located remote from the marine vessel as the off-board alternating current source, and the intermediate subsystem is configured to convert the alternating current for receipt by and charging of the energy storage device.

14. The system according to claim 11, further comprising a control subsystem configured to control power flow within the marine vessel by controlling when the switching device is open or closed in order to provide power to the alternating current bus distribution unit from the energy storage device to operate the marine vessel.

15. The system according to claim 11, wherein the energy storage device is configured to provide the power from the energy storage device to the marine vessel to reduce at least one of fuel used by the marine vessel, emissions output from the marine vessel, or mechanical noise output from the marine vessel.

16. The system according to claim 11, wherein the switching device is configured to control whether the intermediate subsystem is engaged or disengaged from the alternating current bus distribution unit.

17. The system according to claim 11, wherein at least one of the alternating current bus distribution unit, the energy storage device, or the intermediate subsystem is provided as a retrofit assembly for installation on the marine vessel.

18. A method comprising:
coupling an energy storage device that supplies first direct current and that is disposed onboard a marine vessel with a converter device;
coupling the converter device with a switching device that is conductively coupled with an alternating current bus that couples an alternating current generator with one or more alternating current loads onboard the marine vessel, the converter device configured to convert the first direct current from the energy storage device to a first alternating current, the converter device also configured to convert second alternating current provided from at least one of the alternating current generator or an off-board power source to second direct current for charging the energy storage device;
coupling the one or more alternating current loads of the marine vessel with the alternating current bus to be powered by the first alternating current converted by the converter device from the direct current supplied by the energy storage device while at least one engine of the marine vessel is not operating or is operating at a reduced power output to reduce at least one of fuel consumed, emission output, or mechanical noise output by the marine vessel; and controlling the switching device to control when the energy storage device and the converter device are conductively coupled with the alternating current bus, the switching device closing to conductive couple the energy storage device and the converter device with the alternating current bus, the switching device opening to disconnect the energy storage device and the converter device with the alternating current bus while the alternating current generator remains coupled with the one or more alternating current loads.

19. The method according to claim 18, further comprising converting the first direct current supplied by the energy storage device into the first alternating current on the alternating current bus.

20. The method according to claim 18, further comprising converting the second alternating current received from an off-board source to the second direct current to charge or recharge the energy storage device.

21. The method according to claim 18, further comprising conditioning the second alternating current to change at least one of a power level or a waveform of the second alternating current prior to supplying the second direct current to the energy storage device.

22. The system according to claim 1, wherein the converter device includes an inverter configured to convert the first direct current supplied from the energy storage device to the first alternating current provided to the alternating current bus.

23. The system according to claim 1, wherein the converter device includes at least one of a filter or a transformer.

24. The system according to claim 1, wherein the one or more alternating current loads includes a thrust motor of the marine vessel that is powered with the first alternating current that is converted from the first direct current supplied by the energy storage device.

25. The system according to claim 11, wherein the intermediate subsystem includes an inverter device configured to convert the direct current supplied from the energy storage device to the alternating current supplied to the alternating current bus distribution unit.

26. The system according to claim 11, wherein the intermediate subsystem includes at least one of a filter or a transformer.

27. The system according to claim 11, wherein the alternating current bus distribution unit is configured to be conductively coupled with a thrust motor of the marine vessel to power the thrust motor using the alternating current that is converted from the direct current supplied by the energy storage device.

28. A system comprising:
an energy storage device configured to be disposed aboard a marine vessel having an alternating current bus that is connected with an alternating current generator and alternating current loads; and
a converter device configured to be conductively coupled with the energy storage device and the alternating current bus to receive first direct current from the energy storage device and convert the first direct current to a first alternating current that is supplied to the alternating current loads on the alternating current bus, the converter device also configured to receive second alternating current from at least one of the alternating current generator or an off-board source and convert the second alternating current to a second direct current that charges the energy storage device,
wherein the converter device is further configured to control flow of the first alternating current to the alternating current loads such that the converter device can stop the flow of the first alternating current while the alternating current loads are powered by the alternating current generator.

29. The system of claim 28, wherein the energy storage device is configured to provide the first direct current to reduce at least one of fuel consumed, emissions generated, or mechanical noise generated by the marine vessel.

* * * * *